July 9, 1935.                C. H. HUGHES                2,007,200
                          WATER GAS CARBURETOR
                           Filed Nov. 25, 1931
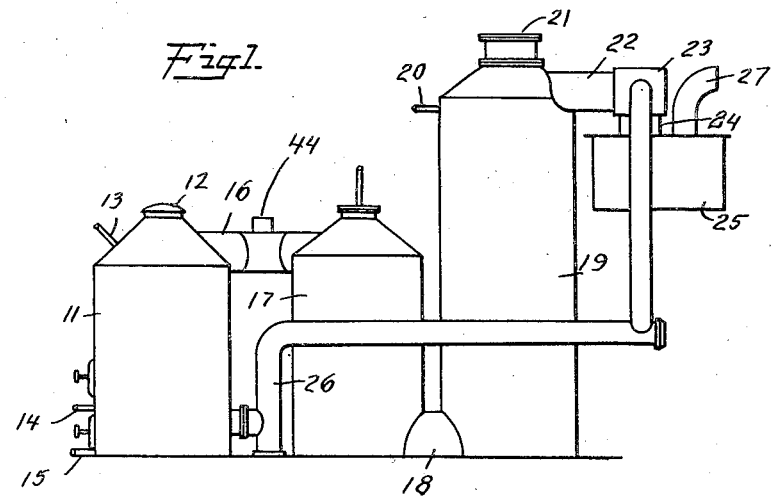
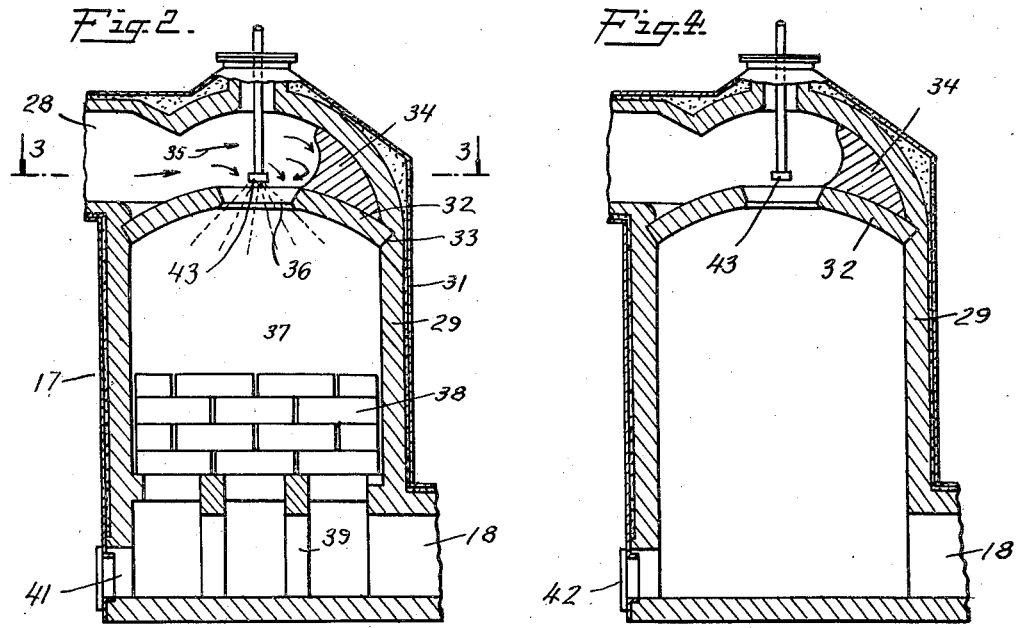
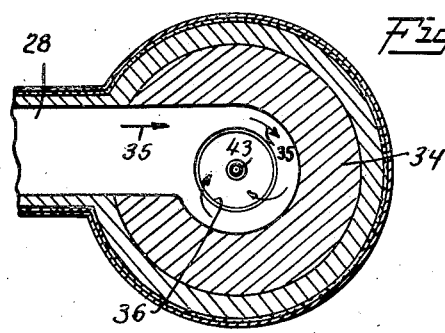
INVENTOR
Charles H. Hughes
BY
ATTORNEY Patented July 9, 1935

2,007,200

UNITED STATES PATENT OFFICE 2,007,200

WATER GAS CARBURETOR

Charles H. Hughes, Glen Ridge, N. J., assignor to Semet-Solvay Engineering Corporation, New York, N. Y., a corporation of New York Application November 25, 1931, Serial No. 577,218

10 Claims. (Cl. 48—79)

This invention relates to carbureted water gas sets and more particularly to the construction of a carbureted water gas set involving a generator, carburetor of special design and a superheater connected in series.

One object of this invention is to provide a carburetor construction in which the blast gases and air are efficiently admixed and ignited upon passage therethrough during the blasting cycle and the make water gas and oil vapors effectively admixed during the water gas making cycles.

Another object is to provide a carburetor which is applicable to the enrichment of water gas with either rich or crude oils.

Other objects and advantages of this invention will appear from the following description.

Heretofore the usual water gas set consisted of a generator, containing a bed of fuel, and a carburetor and super heater, connected in series with the generator. The interiors of both the carburetor and the superheater were built up with checkerbrick material arranged in staggered relation to form tortuous flues. In the manufacture of water gas, blast gases, produced in the generator by the passage of air or other oxygen-containing gas through the fuel bed therein, were discharged from the generator and passed into and through the carburetor and superheater. Secondary air admitted to the carburetor and superheater was admixed with the blast gases, and this mixture was ignited in its passage over the checkerbrick and burned in these chambers, thus heating the checkerbrick. This blasting cycle usually lasted approximately three minutes.

Thereafter, it was discontinued and steam, admitted into the generator, passed therethrough, reacting with the fuel bed therein to produce water gas, which was passed into the carburetor. Oil was introduced into the top of the carburetor, the resultant oil gas, together with the water gas, passing over the checkerbrick therein into and through the superheater. The mixture of oil gas and water gas, in its passage through the carburetor and superheater chambers, was fixed to form carbureted water gas. Thereafter, if desired, steam was passed in reverse flow through the superheater and carburetor units, down through the fuel bed in the generator, the resultant water gas being withdrawn directly from the generator. When the temperatures of the fuel bed and the carburetor and superheater chambers had been reduced so that water gas could no longer be generated, the gas making cycles were discontinued, and the fuel bed again blasted with air or other oxygen-containing gas and upon completion of this blasting cycle, the water gas making cycles were repeated.

It has been proposed to substitute for the usual enriching oil, which does not form substantial carbonaceous deposits in the checkerbrick, Bunker-C or crude oil. In practice, however, it has been found that Bunker-C or crude oils leave a large carbonaceous deposit on the checkerbrick in the carburetor, clogging the flues and necessitating frequent shut-downs for recheckering. The arrangement of checkerbrick in the carburetor precludes the cleaning thereof without removing the checkerbrick from the carburetors and consequently the entire checkerwork had to be replaced, hence entailing arduous and time-consuming labor and decreasing the gas making capacity of the plant since the carburetor had to be taken out of operation for a considerable period of time.

In accordance with Doherty Patent 992,944 of May 23, 1911, checkerbrick has been omitted from the top portion of the carburetor of a water gas set and the carburetting oil introduced into the unobstructed space at the top of the carburetor, into the downwardly flowing water gas stream, passing therethrough. Further, in view of the clogging of the checkerbrick when using Bunker-C or crude oils, it has been proposed to omit the checkerbrick in the carburetor and introduce Bunker-C or crude oils as the enriching medium into the top thereof, the oil gas and water gas flowing in the same direction down through the carburetor into the base of the superheater and up therethrough. Operating in this manner during the blasting cycle, blast gases sweep through the carburetor without substantial ignition thereof and consequently only a portion of the sensible and little or none of the latent heat of the gases is effective in heating the carburetor. Furthermore, operation in this manner creates a serious danger of the non-ignited mixture of air and blast gases exploding in the carburetor.

In contradistinction to prior constructions, the carburetor of this invention is provided with a refractory dome in the top thereof disposed below the tangential side gas inlet into the carburetor. Preferably the portion of the carburetor above the dome is substantially completely filled with refractory material except for a flue leading from the inlet into a central opening in the dome coaxial with the longitudinal axis of the carburetor. With this construction, during the blasting cycle, the blast gases coming from the generator, admixed with air or other oxygen containing gas introduced into the generator-carburetor connection, are deflected spirally downward into the body of the carburetor, passing centrally therethrough. The spiral or whirling motion imparted to the water gas upon its entrance into the carburetor and the introduction of oil coaxial with the axis of the carburetor, as more fully pointed out hereinafter, accomplishes the efficient admixture of these two media. Further, the passage of the mixture of air and blast gases through the mass of refractory material in the top of the carburetor causes substantially instantaneous ignition thereof and consequently the sensible and latent heat of the blast gases are efficiently utilized in heating the carburetor and superheater. The refractory material in the top of the carburetor acts as a heat reservoir and insures substantially immediate ignition of the mixture of blast gas and air upon its entrance into the carburetor.

Oil is preferably introduced through the central opening of the dome in a direction coaxial with the flow of water gas through this opening. Due to the large mass of refractory material which, as mentioned above, acts as a heat reservoir, the oil upon its introduction is efficiently vaporized. The agitation and turbulence set up by the spiral or whirling flow of water gas through the spiral flue in the top of the carburetor into and through the opening of the dome, accomplishes effective admixture of the water gas and oil. This admixture in its subsequent passage through the remainder of the carburetor and the superheater is fixed.

In the accompanying drawing, forming a part of this specification and showing for purposes of exemplification, preferred forms of the invention but without limiting the claimed invention to such illustrative instances—

Fig. 1 is a side elevation of a water gas set equipped with a carburetor of this invention;

Fig. 2 is a vertical section of a carburetor and illustrates a preferred embodiment of my invention;

Fig. 3 is a horizontal section through the carburetor of Fig. 2 taken in a plane passing through the line 3—3 of Fig. 2; and Fig. 4 is a vertical section through a modified form of carburetor of this invention.

With reference to Fig. 1, reference numeral 11 designates a water gas generator containing a bed of fuel (not shown). A charging opening 12 for fuel is provided in the top of the generator. Steam for reaction with the fuel bed to form water gas may be supplied to the generator through pipes 13 and 14 and air for blasting the fuel within the generator may be supplied through the air blast pipe 15. Generator 11 communicates by means of pipe 16 with the top of carburetor 17. Pipe 16 is in the form of an elbow and leads from the top of generator 11 into the top side of carburetor 17.

A conduit 18 connects the bottom of generator 17 with a superheater 19 which has a steam inlet pipe 20 at the top thereof. Superheater 19 is provided with a stack 21 for discharging waste gases during the blasting cycle. An offtake 22 leads from the top of the superheater into a housing 23 which in turn communicates by means of pipe 24 with a wash box 25. Conduit 26 leads from the base of the generator 11 to the housing 23. A suitable valve is positioned in housing 23 to control flow through the set in accordance with customary water gas making practice. Wash box 25 is provided with outlet pipe 27 for flow of gas from the wash box through the usual scrubbing and purifying apparatus (not shown).

In the embodiment of the invention shown in the drawing, the carburetor is in the form of a cylindrical chamber having top side inlet port 28 which communicates with the elbow connection 16. The interior of the carburetor is lined with refractory material 29 between which and the metal shell 31 suitable insulation may be placed. A dome 32 of refractory material is disposed in the top of the carburetor and extends from side to side thereof preferably bonding with the refractory lining 29 as indicated by the reference number 33. The portion of the carburetor above the dome 32 is completely filled with refractory material 34 (Figs. 2 and 3) except for a central opening or flue 35, hereinafter more fully described, which causes a spiral flow of gas as indicated by the arrows in Fig. 3.

One end of the inlet flue 35 communicates with inlet port 28 of the carburetor, port 28 being tangential to flue 35. The other end of the flue or opening 35 terminates into a circular opening 36 extending through the dome 32. Opening 36 is preferably substantially concentric with the longitudinal axis of flue 35 and is also preferably substantially coaxial with the longitudinal axis of the carburetor 17.

In the form of the invention shown in Fig. 2, the portion of the carburetor beneath dome 32 is provided with a space 37 of substantial capacity. Space 37 is open and unobstructed, i. e., is devoid of checkerbrick. Beneath the space 37 several layers of checkerbrick are built up resting on arches 39 disposed on the base of the carburetor. A clean out port 41 is provided in the side wall of the carburetor in the base portion thereof for the removal of carbonaceous deposits settling to the bottom of the carburetor.

For installations in which crude oil is exclusively employed for enriching the water gas, the form of carburetor shown in Fig. 4 may be used. This carburetor differs from that of Fig. 2 in that the portion thereof below the dome 32 is completely devoid of checkerbrick.

Oil may be introduced into the carburetor through oil spray 43 disposed directly above opening 36 and arranged to discharge oil in atomized form through this opening into the space 37 below.

The operation of the above described set usually comprises three cycles, i. e., a "blasting cycle", and "up-run" cycle, and a "back-run" cycle. In the blasting cycle, air is passed into the generator through main 15 and passes through the fuel therein, raising the temperature thereof until the fuel becomes an incandescent mass. The resultant blast gases are passed into the carburetor 17 through conduit 16. Secondary air is admitted into the carburetor at 44 and the mixture of air and gas enters flue 35 passing in contact with refractory material 34 of dome 32 into and through opening 36. Passage of the mixture through flue 36 imparts a whirling spiral motion thereto causing intimate admixture of the air and gas and immediate ignition upon entry into the carburetor due to the intimate contact with the refractory material, which, as pointed out above, acts as a heat reservoir. As a result, the refractory material becomes further heated and the refractory lining 29 and checkerbrick 38 become very highly heated. The resulting blast gases pass from the carburetor through conduit 18 into superheater 19. The waste gases, after heating the interior of the superheater, are discharged through the stack 21.

When the refractory material in the carburetor and superheater are brought to the requisite temperatures, the flow of air to the generator is discontinued and either the up-run or back run cycles commenced. For the up-run cycle, steam is passed through pipe 14 into the base of the generator and passes up through the fuel bed, reacting therewith to form water gas. The water gas thus formed passes through conduit 16, inlet 28, flue 35, into and through opening 36 in dome 32. Simultaneously with the passage of the water gas oil is admitted through spray nozzle 43. The direction of flow of the oil is substantially coaxial with the axis of the carburetor. The water gas in its passage through flue 35 is given a whirling motion admixing with the oil vapors. By reason of the transfer of heat from the refractory material from the top of the carburetor the oil is efficiently volatilized and cracked with the production of carbonaceous material and oil gas. As indicated above, the oil gas becomes intimately mixed with the water gas due to the turbulence set up by the incoming water gas, and the admission of oil centrally of the flow of water gas through opening 36. The high temperature present in the carburetor as a result of the heat contained in the upper refractory portion, the lining 29 and checkerbrick 38 partially fixes the mixture of the oil gas and water gas and assists in the production of a fixed homogeneous product.

The resultant mixture passes from the carburetor through the conduit 18 to the superheater 19 wherein fixation is completed. From the superheater the carbureted water gas formed passes through conduit 22, housing 23, conduit 24 into the wash box 25, from which it is led through outlet 27 to a suitable holder or the usual gas purifying apparatus. The up-run period may be immediately followed by a back-run period. For this purpose, conduit 22 is closed to the flow of gas and steam is admitted at 20 or 13. The steam admitted at 20 is superheated in its passage through the superheater and the carburetor, and passes into the top of the generator downwardly through the fuel bed therein. The water gas formed passes out of the generator through the conduit 26 into the washbox 25.

Employing a carburetor of the type shown in Fig. 4, Bunker-C refined or unrefined oils of low cost may be efficiently utilized in the enrichment of water gas, the large unobstructed spaces at the base of the carburetor permitting the settling of the carbonaceous material formed from the cracking of the crude oil from which spaces the residue may be readily removed through the port 32. The type of carburetor shown in Fig. 2 may also be used for the enrichment of water gas with crude oils, the high temperatures prevailing in the top of the carburetor causing effective vaporization of the oil. Any carbonaceous material formed settles through chamber 37 onto and through the openings between checkerbrick onto the base of the carburetor, from whence it may be readily withdrawn. High grade oils may be used in either type of carburetor for the enrichment of the make gas with increased oil efficiencies as compared with usual types of carburetors.

It will be noted that the spiral flow of air and blast gases through the port 28 and flue 35 results in an efficient admixture of air and blast gases prior to introduction thereof into vaporizing space 37. The passage of this mixture over the mass of refractory material in the top of the carburetor causes substantially instantaneous ignition thereof. It will be further noted that the whirling motion imparted to the water gas upon its entrance into space 37 and dome 32 and the substantially coaxial introduction of oil causes intimate admixture of the water gas and oil vapors.

Further, the invention herein is applicable to existing types of carburetors utilized for carbureting water gas without involving substantial reorganization thereof. Existing carburetors may readily be modified to embody the invention by changing the top portion thereof so that they correspond with the carburetors shown in the drawing herein.

The invention as hereinabove disclosed is embodied in a particular form of construction, but it may be variously embodied within the scope of the following claims.

I claim:

1. A carburetor of a water gas set comprising a refractory lined chamber having a refractory dome provided with an opening, said carburetor having a side inlet for flow of air and blast gases therethrough during the blasting cycle, and for flow of water gas therethrough during the water gas making cycle, said inlet being disposed tangentially to said opening in said dome, whereby the flow of air and blast gases during said blasting cycle through said side inlet and said opening into the portion of the carburetor beneath the dome is in a spiral path resulting in efficient admixture of air and blast gases passing therethrough into the carburetor, and the flow of water gas during the water gas making cycle likewise is in a spiral path, and means for introducing oil into the water gas stream passing through the carburetor.

2. A carburetor of a water gas set comprising a refractory lined chamber having a refractory dome provided with an opening, said carburetor having a side inlet for flow of air and blast gases therethrough during the blasting cycle, and for flow of water gas therethrough during the water gas making cycle, said inlet being disposed tangentially to said opening in said dome, means to introduce oil through said opening during the water gas making cycle, whereby the flow of air and blast gases during said blasting cycle through said side inlet and said opening into the portion of the carburetor beneath the dome is in a spiral path resulting in efficient admixture of air and blast gases passing therethrough into the carburetor and the flow of water gas during the water gas making cycle likewise is in a spiral path and the oil is introduced into the spiral path of flow of the water gas resulting in efficient admixture of the oil and water gas.

3. A carburetor of a water gas set comprising a refractory lined chamber having at its top a refractory dome provided with a circular opening, said carburetor having a side inlet at its top for flow of air and blast gases therethrough during the blasting cycle, and for flow of water gas therethrough during the water gas making cycle, said inlet being disposed tangentially to said circular opening in said dome, and said carburetor being substantially unobstructed below such dome, means to introduce oil through said circular opening into the unobstructed portion of said carburetor during the water gas making cycles, whereby the flow of air and blast gases during said blasting cycle through said side inlet and said circular opening into the portion of the carburetor beneath the dome is in a spiral path resulting in efficient admixture of air and blast gases, and the flow of water gas during the water gas making cycle likewise is in a spiral path with the oil introduced into the spiral path of flow of the water gas resulting in efficient admixture of the oil and water gas.

4. In a carburetted water gas set designed to carburet water gas with crude oil forming large carbonaceous deposits upon decomposition of the oil, a carburetor comprising a refractory lined chamber, a refractory dome disposed within said chamber near the top thereof and having an opening centrally located in said dome, a gas inlet port in said chamber above said dome said port being disposed tangential to said opening in said dome, and means for introducing crude oil into said chamber through said opening in said dome.

5. In a carburetted water gas set, a carburetor comprising a refractory lined chamber, a refractory dome disposed within said chamber and bonding with said refractory lining near the top thereof, said dome having an opening centrally located therein, said chamber having a gas inlet flue above said dome and a flue in said dome connecting the opening therein with said gas inlet flue, the lower portion of said chamber being filled with refractory material, the upper portion of said chamber between the top of said material and said dome constituting an unobstructed space, and means for introducing oil into said space.

6. In a carburetted water gas set, a carburetor comprising a refractory lined chamber, a refractory dome disposed within said chamber near the top thereof and having an opening centrally located in said dome, said carburetor being provided with a top side inlet, a substantially spiral flue connecting said inlet with said opening in said dome, the portion of said carburetor below said dome being devoid of checkerbrick, and means for introducing oil through said opening in said dome.

7. In a carburetted water gas set comprising a generator and a refractory lined carburetor, a connection leading from the top of the generator into the top side of the carburetor for passage of blast gases and water gas therethrough, means for introducing air into said connection during the passage of blast gases therethrough, said carburetor having a refractory dome therein disposed below the inlet of said connection into the carburetor and bonding with said refractory lining, said dome having a central opening for passage of blast gases and water gas therethrough coaxial with the longitudinal axis of the carburetor, said dome serving to admix and ignite the air and blast gases passing through said opening therein, and means for spraying oil into said carburetor disposed above said opening in said dome.

8. A carburetor for carburetting water gas with crude oil forming large carbonaceous deposits upon decompisition of said oil, having the top end composed of a substantially solid mass of refractory material bonding with a refractory lining for said carburetor and disposed below a side inlet in said carburetor, said mass of refractory material having a spiral inlet flue therein leading into a circular opening communicating with said carburetor, and an oil inlet disposed to introduce oil into sair carburetor through said circular opening.

9. A carburetor for carburetting water gas with crude oil forming large carbonaceous deposits upon decomposition of said oil, having the top end composed of a substantially solid mass of refractory material bonding with the refractory lining for said carburetor and disposed below a side inlet in said carburetor, said mass of refractory material having a spiral inlet flue therein leading into a circular opening communicating with said carburetor, a portion of said carburetor below said solid mass of refractory material being devoid of checkerbrick, and an oil inlet disposed to introduce oil into said carburetor through said circular opening.

10. A carburetor of a water gas set comprising a refractory lined chamber having a dome in the top thereof bonded with said refractory lining, said carburetor having a side inlet and said dome having a central opening and constituted of a mass of refractory material having built therein a flue connecting said side inlet with said central opening, the connection of said flue with said central opening being disposed tangentially to said opening, and means for introducing enriching material into the carburetor.

CHARLES H. HUGHES.